(12) United States Patent
Rea

(10) Patent No.: US 6,249,058 B1
(45) Date of Patent: Jun. 19, 2001

(54) WIND DRIVEN GENERATOR HAVING COUNTER-ROTATING ARMATURE AND ROTOR

(76) Inventor: Monte L. Rea, 711 Green Rd., Madison, IN (US) 47250

( * ) Notice: Subject to any disclaimer, the term of this patent is extended or adjusted under 35 U.S.C. 154(b) by 0 days.

(21) Appl. No.: 09/454,432

(22) Filed: Dec. 3, 1999

(51) Int. Cl.[7] .................................................. F03D 9/00
(52) U.S. Cl. ................................................. 290/55; 290/44
(58) Field of Search .................... 290/43, 44, 54, 290/55

(56) References Cited

U.S. PATENT DOCUMENTS

| | | | |
|---|---|---|---|
| D. 384,165 | 9/1997 | Suciu | D25/1 |
| 2,153,523 | 4/1939 | Roberts et al. | 290/55 |
| 2,177,801 | 10/1939 | Erren | 290/55 |
| 2,332,294 | 10/1943 | Bohmfalk | 202/234 |
| 4,057,270 | 11/1977 | Lebost | 290/54 |
| 4,061,926 * | 12/1977 | Peed | 290/55 |
| 4,345,161 | 8/1982 | Crompton | 290/55 |
| 4,419,587 | 12/1983 | Benton | 290/44 |
| 5,384,489 | 1/1995 | Bellac | 290/44 |
| 6,097,104 * | 8/2000 | Russell | 290/54 |
| 6,127,739 * | 10/2000 | Appa | 290/55 |
| 6,172,429 * | 1/2001 | Russell | 290/54 |

* cited by examiner

Primary Examiner—Nicholas Ponomarenko
(74) Attorney, Agent, or Firm—Kyle S. Brant

(57) ABSTRACT

A wind driven generator with counter-rotating armature and rotor is disclosed. In a first embodiment a rotor having magnets mounted thereon and an armature having windings disposed thereon are both coaxially mounted about a hollow pole. The hollow pole provides the structural support for maintaining the generator in a vertical attitude. Bearings are situated between the armature and pole, and between the rotor and the pole. A commutator and brushes is employed to conduct the power signal generated in the windings to electrical device. In a second embodiment, a rotor and armature are disposed about and rotatably mounted on a hollow pole as in the first embodiment with the hollow pole coaxially situated over a second vertical pole. The hollow pole is sized for sufficient clearance to allow the hollow pole to slide vertically on the second pole. A pulley and cable mechanism is employed so that the hollow pole and generator attached thereto may be easily raised for operation in higher velocity winds yet readily lowered for servicing and maintenance thereof.

13 Claims, 4 Drawing Sheets

WIND DRIVEN GENERATOR HAVING COUNTER-ROTATING ARMATURE AND ROTOR

FIELD OF THE INVENTION

This invention relates in general to electricity producing devices and more particularly to wind driven generators and the like.

BACKGROUND OF THE INVENTION

Wind powered electricity generating devices provide a pollution free alternative to the generation of electricity by coal burning or nuclear fueled power generation mechanisms. Wind powered generators will enjoy a increased usage in the future in view of the rapidly dwindling natural resources currently used for power generation throughout the world.

Many styles and variations of wind powered generators are known, including those disclosed in the following U.S. Pat. Nos. 5,384,489 to Bellac; No. 4,419,587 to Benton; No. 4,382,190 to Jacobson; No. 4,345,161 to Crompton; No. 4,057,270 to Lebost; No. 2,177,801 to Erren; No. 2,332,294 to Bohmfalk; No. 2,153,523 to Roberts et al.; and No. D384,165 to Suciu. Wind generation devices disclosed in these patents include improvements in wind collection efficiency, counter-rotating mechanisms, and friction reducing designs.

Generally, the counter-rotating armature/rotor designs of the prior art are unduly complex and expensive to construct. Further, the counter-rotating wind driven generators of the prior art are not readily raised to capture higher velocity winds and also capable of being lowered to ground level for maintenance or repair purposes. One prior art design discloses a hydraulic mechanism for raising and lowering the device, U.S. Pat. No. 2,177,801. However, such a mechanism is expensive and inflexible.

What is needed is a counter-rotation wind powered electric generator whose design incorporates more efficient and more economical features for use in a variety of climatic conditions. The device should also include ease of repair and maintenance features.

SUMMARY OF THE INVENTION

A wind driven generator, according to one aspect of the present invention, comprises a vertically oriented stationary pole, commutator means coaxially disposed coaxially about and attached to the pole and including a first metal ring and a second metal ring, wherein the first metal ring and the second metal ring encircle the pole, armature means coaxially disposed about the pole in close proximity to the commutator means, the armature means including a winding having a first lead and a second lead, the armature means further including a first brush and a second brush, the first brush situated to make contact with the first metal ring and the second brush situated to make contact with the second metal ring, and wherein the armature means includes first bearing means attached to and disposed between the armature means and the pole for reducing rotational friction, rotor means coaxially disposed about the pole and disposed radially outward of and in close proximity to the armature means, the rotor means including a plurality of magnets situated adjacent the winding and producing a plurality of flux fields that impinge upon the winding when the rotor means rotates about the pole, and wherein the rotor means includes second bearing means attached to and disposed between the rotor means and the pole for reducing rotational friction, first wind collecting means attached to the armature means for collecting wind and inducing the armature means to rotate with respect to the pole, and second wind collecting means attached to the rotor means for collecting wind and inducing the rotor means to rotate in a direction opposing the direction of rotation of the armature means.

One object of the present invention is to provide an improved wind driven generator.

Another object of the present convention is to provide a wind driven generator that is readily elevated into higher velocity wind occurrence and easily lowered for servicing and maintenance.

Still another object of the present convention is to provide a wind driven generator that is more economical to manufacture.

These and other objects of the present convention will become more apparent from the following description of the preferred embodiments.

DESCRIPTION OF THE PREFERRED EMBODIMENT

Figure 1:
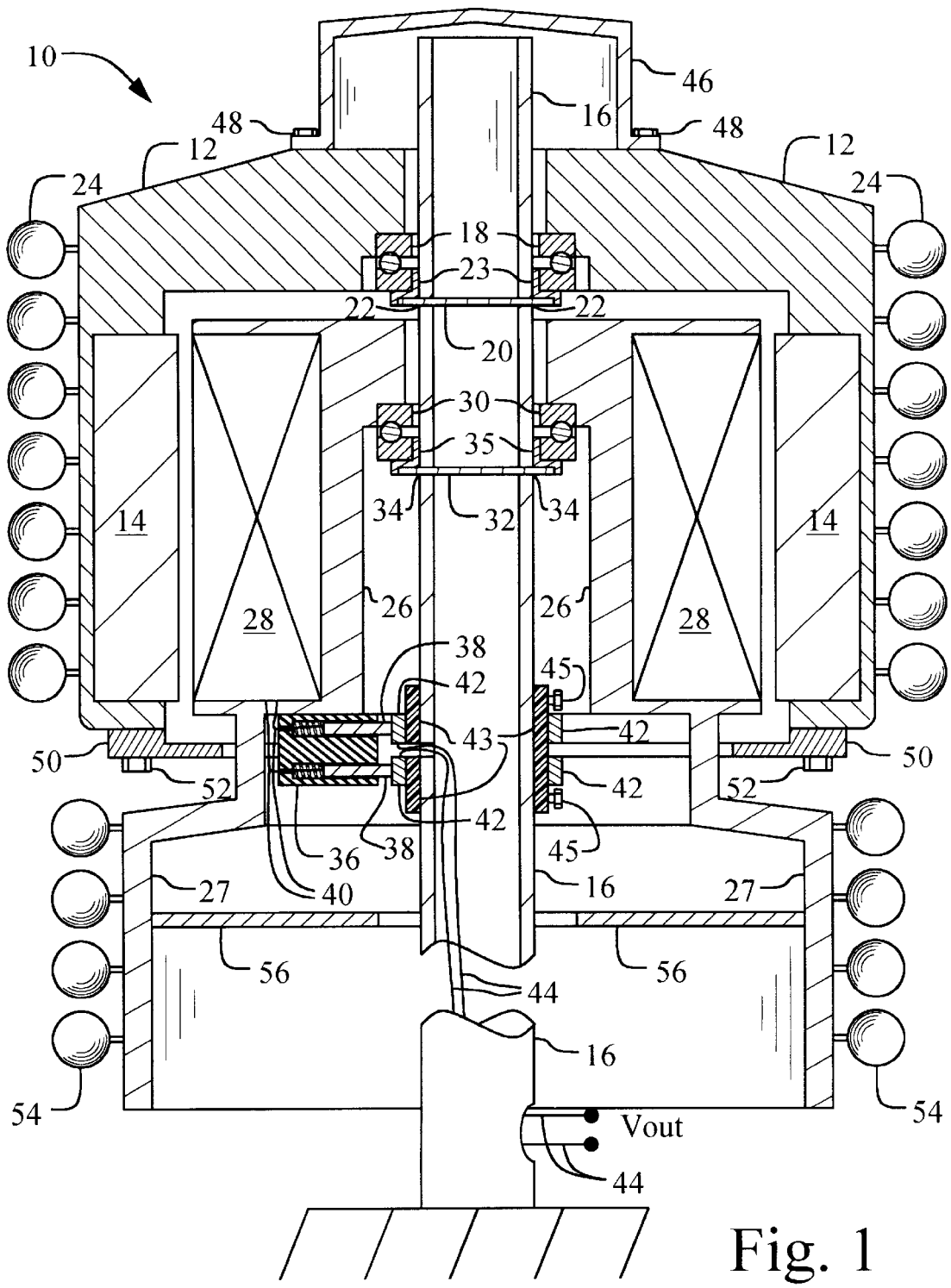
FIG. 1 is a cross-sectional view of a first embodiment of a wind driven generator having counter-rotating armature and rotor according to the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated devices, and such further applications of the principles of the invention as illustrated therein being contemplated as would normally occur to one skilled in the art to which the invention relates.

Referring now to FIG. 1, a cross-sectional view of a wind driven generator 10 having counter rotating armature and rotor in accordance with the present invention is shown. Generator 10 includes a rotor 12 having magnets 14 attached thereto. Rotor 12 is disposed over pole 16. Rotor 12 rests upon and is supported by bearing 18. A dowel pin 20 is inserted into apertures 22 in pole 16. Dowel pin 22 provides vertical support beneath collar or spacer 23, which supports bearing 18 in position with respect to pole 16. Collar 23 has an inner diameter corresponding to the diameter of pole 16 and an outer diameter matching the inner diameter of bearing 18. Wind collectors 24 are attached to the external surface of rotor 12 for collecting wind and importing rotary motion to rotor 12.

Device 10 also includes armature 26, which is the second classical component of a generator. Armature 26 includes coil windings 28 disposed thereon. Armature 26 is vertically supported by bearing 30. Bearing 30 is vertically supported by collar or spacer 35, and spacer 35 rests upon dowel pin 32. Collar 35 has an inner diameter corresponding to the diameter of pole 16 and an outer diameter slightly smaller than the inner diameter of bearing 30. Dowel pin 32 is disposed in apertures 34 of pole 16. Bearing 30 and armature 26 are preferably an interference fit to mechanically retain armature 26 to bearing 30. Likewise, rotor 12 and bearing 18 are preferably press fit together. Attached to the underside of armature 26 is brush housing 36. Brush housing 36 contains brushes 38. Brushes 38 are electrically connected to coil windings 28 by way of electrical leads 40. Brushes 38 make electrical contact with commutator rings 42. Commutator rings 42 are mounted or attached to insulator 43. Insulator 43 is secured in place on pole 16 in the position shown by clamp bolts 45, though a dowel pin through pole 16 is also contemplated as suitable to vertically support insulator 43 in the position shown. Wires or leads 44 are attached to commutator rings 42. Leads 44 conduct electricity generated in winding 28 to external devices requiring electrical power.

Also shown in FIG. 1 is weather cap 46. Weather cap 46 is attached in place over pipe 16 and rotor 12 by bolts 48. Further, whether protection ring 50 is attached to the underside of rotor 12 via bolts 52. Cap 46 and ring 50 provide protection against the elements such as rain, sleet, ice and snow. Extending downward from armature 26 is lower armature portion or extension 27. Attached to the outer surfaces of portion 27 are wind collectors 54. Wind collectors 24 and wind collectors 54 are oriented so that armature 26 and rotor 12 rotate in opposition to one another. A counter-rotational generator produces more electricity than a generator that incorporates a single wind driven rotating device. Extending inward from lower armature portion 27 is weather protection disk 56. Disk 56 is attached to armature portion 27 (by any means well known in the art such as brackets, weldments, adhesives and the like) and prevents inclement weather from interfering with the operation of the internal components of device 10, including brushes 38, commutator 42 and bearing 30.

Operationally, device 10 is placed on pole 16 so that natures winds will impart rotary motion to the rotor 12 and armature 26. Wind collectors 24 urge rotor 12 to rotate in a clockwise direction. Wind collectors 54 urge rotation of armature 26 in a counter-clockwise direction. Magnets 14 produce a magnetic flux field and movement of the windings 28 through that field induces a current to flow in windings 28. Current induced in windings 28 is conducted through brushes 38, commutator rings 42, and leads 44 to devices requiring electrical power, or to batteries (not shown) for storage of electrical power for later use. The generator 10 shown produces an AC output signal. It is well known in the art that a full wave rectifier (not shown) may be used to convert the output signal on leads 44 to a DC signal. However, it is also contemplated that a DC generator may be constructed using the concepts and techniques disclosed herein, and including a multi-segmented commutator coaxial with pole 16 and having a commutator segment pair for each winding, as is well known in the art of DC generators.

Figure 2:
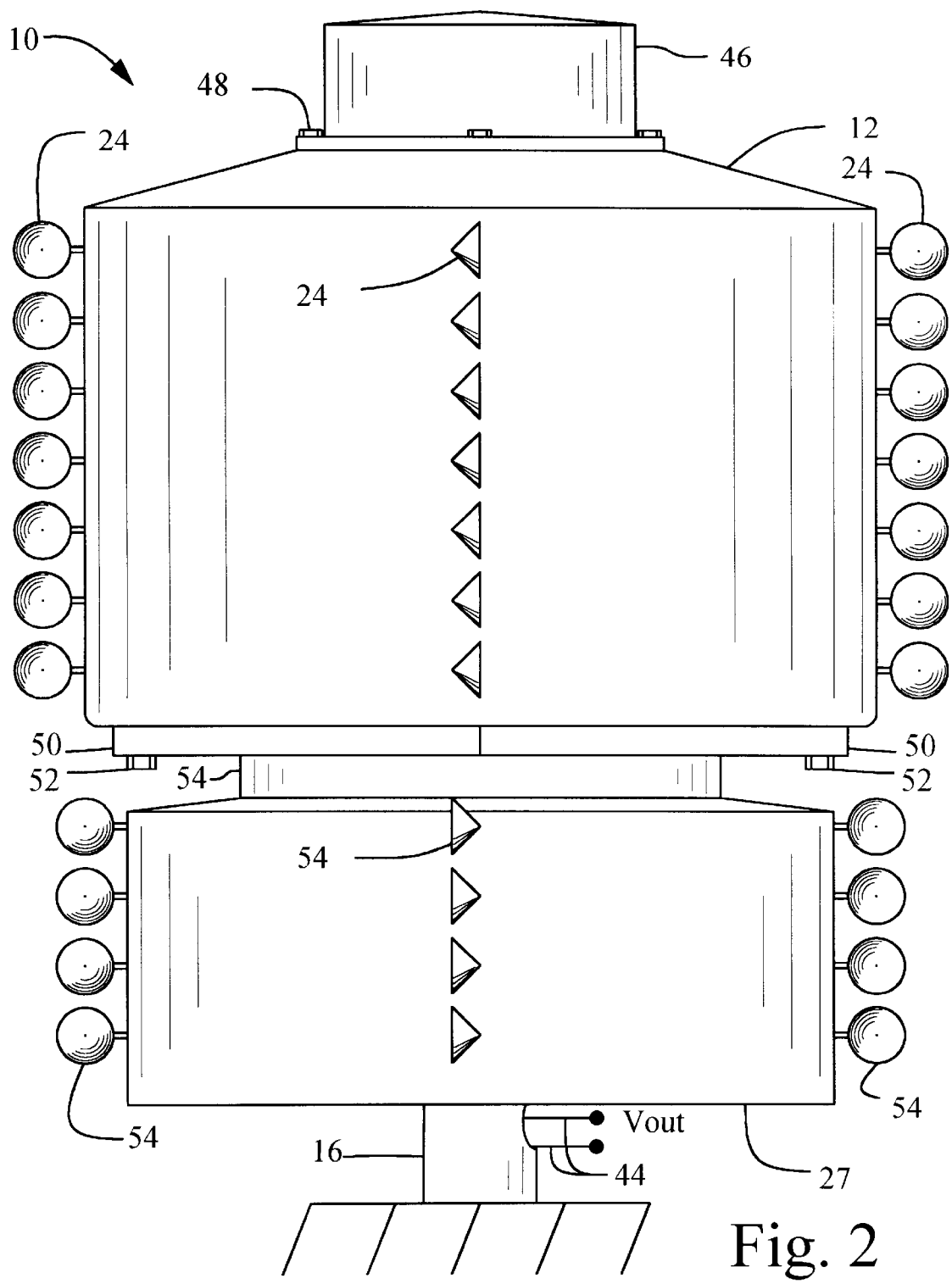
FIG. 2 is an elevational view of the wind driven generator of FIG. 1.

Referring now to FIG. 2, a front elevational view of the wind powered generator 10 according to the present invention is shown. Rotor 12 is shown having a plurality of wind collectors 24 attached to the periphery of rotor 12. Lower armature portion 27 is shown with a plurality of wind collectors 54 attached to the periphery thereof and positioned so that rotational energy imparted to armature 26 through armature portion 27 is in an opposite direction compared to the rotational motion of rotor 12. Pole 16 is also shown anchored to earth or similar sturdy mounting location. Weather protection ring 50 is shown secured to rotor 12 via bolts 52. Weather cap 46 is also shown attached to rotor 12 via bolts 48. The output voltage Vout from generator 10 is produced at leads 44.

Rotor 12 and armature 26 are preferably made from non-ferrous materials such as plastic, aluminum or the like. Lighter weight materials are preferred in wind driven generators, as is well known in the art so that start-up friction is minimized. Bearings 18 and 30 are standard steel ball bearings that have an inner diameter sized to provide adequate clearance between pole 16 and the bearing inner diameter surfaces. The outer diameter of bearings 18 and 30 is sized for a slight interference fit between the outer diameter thereof and rotor 12 and armature 26 so that the bearings 18 and 30 may be pressed into same. Pole 16 is preferably a pipe made of steel or other sturdy synthetic material. Wind collectors 24 and 54 are constructed of plastic, aluminum or other such durable and lightweight materials.

Figure 3:
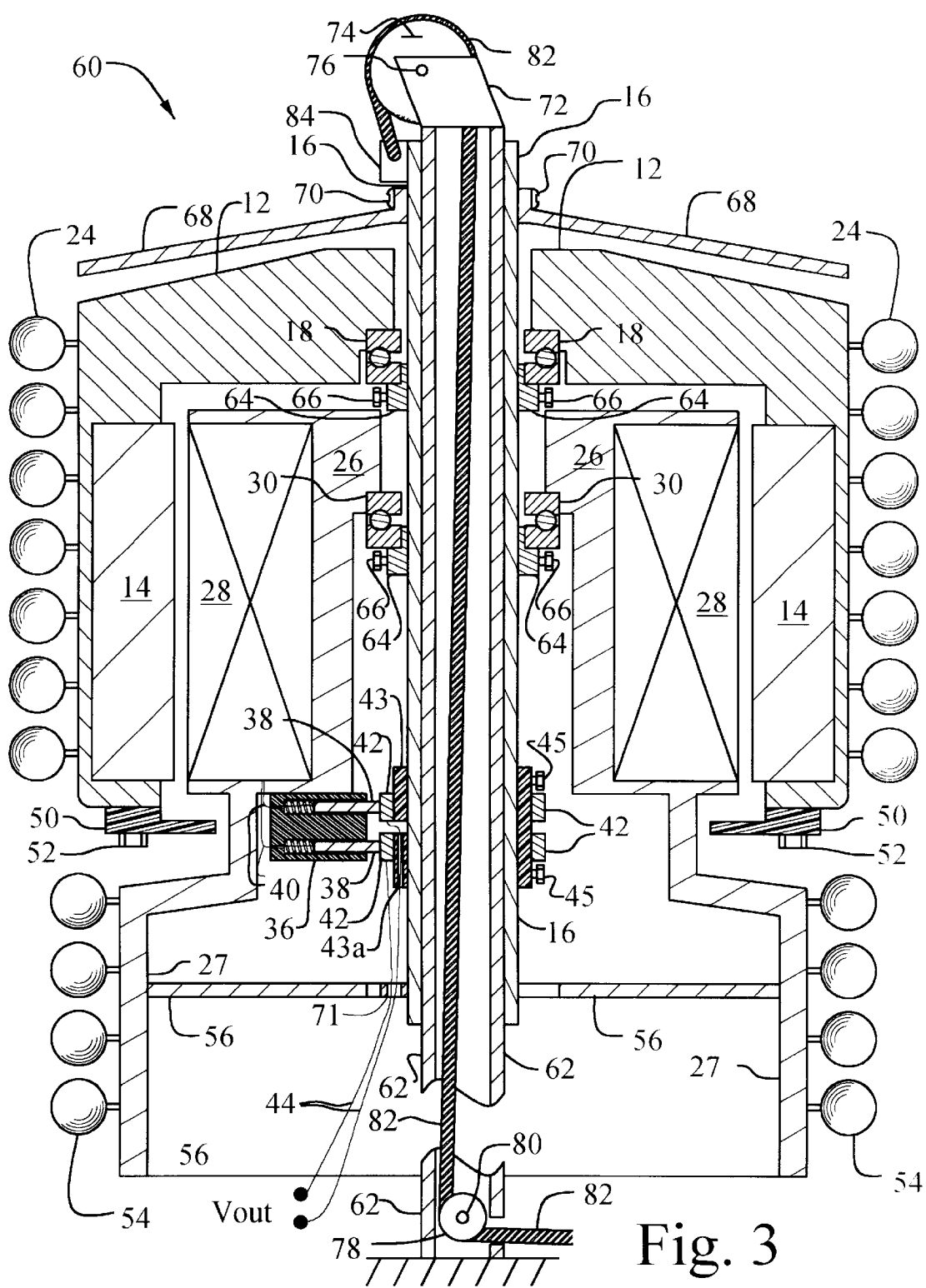
FIG. 3 is a cross-sectional view of a second embodiment of a wind driven generator having counter-rotating armature and rotor according to the present invention.

Referring now to FIG. 3, another embodiment of a wind driven generator 60 having counter-rotating rotor and armature, according to the present invention, is shown. Items with like identifying numerals as in FIG. 1 are identical in form and function with their counterpart in FIG. 1 and further detailed description thereof is unnecessary in describing the alternative features of generator 60. Primarily, generator 60 functions in substantially the same fashion as generator 10. Generator 60 includes mechanisms and design features, described below, that enable generator 60 to be raised and lowered easily on a sturdy pole 62. It is desirable to move a wind driven generator upwards into stronger air currents, yet also desirable to lower the generator for periodic maintenance or repair thereof No generators of the known prior art provide such functionality as well as reduced economic cost as does generator 60.

Generator 60 comprises a rotor 12, an armature 26, bearings 18 and 30, wind collectors 24 and wind collectors 54. Rotor 12 and armature 26 are coaxial with hollow pole 16. Pole 16 is coaxial with pole 62 with a slight gap therebetween so that pole 16 may move easily in a vertical direction while situated about pole 62. Brush housing 36 contains brushes 38 that contact commutator rings 42 so that electrical power generated by rotary motion of magnets 14 and windings 28 may be transmitted via leads 44 to external electrical devices requiring electrical power. Commutator rings 42 are attached to insulator 43. Insulator 43 includes, in addition to what is shown in FIG. 1, an aperture 43a through which one of the leads 44 extends for connection to the upper one of the two commutator rings 42. Insulator 43 is affixed to pole 16 by bolts 45 in a location corresponding with the vertical position of brushes 38. Clamp rings 64 slide over pole 16 and are secured to the outer surface of pole 16 by bolts 66. Clamp rings 64 provide a stable secure seat upon which bearings 18 and 30 are situated. A conically shaped weather cover 68 is attached in the position shown to pole 16 via set screws 70. An eyelet 71 is attached to the external surface of pole 16 and provides a protective guide for leads 44. Also shown in FIG. 3 are weather protection ring 50, weather protection disk 56, armature portion 27, bolts 52, bolts 45, winding leads 40 and output leads 44.

A pulley bracket 72 is attached to the uppermost portion of pole 62. Pulley 74 is mounted on pulley bracket 72 and rotates on pin 76. Pulley 78 is disposed within and near the base of pole 62. Pulley 78 is mounted on pin 80 which is cotter-pinned or welded in location within the interior of pole 62. A cable 82 passes over pulley 80, though and within pole 62 and over pulley 74. Cable 82 is attached to mounting stud 84. Mounting stud 84 is securely attached to pole 16 via weldment or adhesives. In use, cable 82 raises and lowers generator 60 on pole 62. Cable 82 is secured to the exterior surface of pole 62 to a cable retaining mechanism (not shown) when generator 60 is raised to its maximum vertical position on pole 62. Since inner pole 62 provides the bulk of the structural support for device 60, pole 16 may be constructed of plastic or other non-conducting materials well known in the art thereby eliminating the need for insulator 43 and allowing the commutator rings 42 to be attached directly to pole 16. The mechanism shown, including a simple pulley lifting device, coupled with a generator design that accommodates a pole therethrough, resolves the continuing challenge related to the lowering, for servicing and maintenance, of a counter-rotating wind driven generator that is raised above ground level for contact with higher velocity winds.

Figure 4:
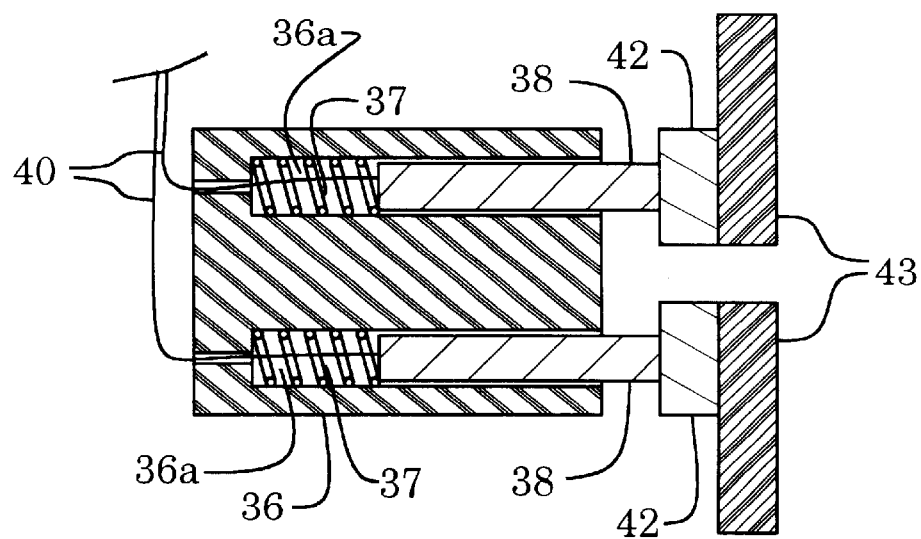
FIG. 4 is an enlarged cross-sectional view of the brush housing assembly of FIG. 1.

Referring now to FIG. 4, a more detailed cross-sectional view of the brush housing 36 and surrounding features of FIG. 1 is shown. Brush housing 36, manufactured from non-conductive materials well known in the art, contains apertures 36a wherein brushes 38 and springs 37 are disposed. Springs 37 urge brushes 38 into physical and electrical contact with commutator rings 42. Leads 40 are electrically attached to brushes 38 and windings 28 to conduct electricity generated by device. Brushes 38 make electrical contact with commutator rings 42. Commutator rings 42 are securely attached to insulator 43.

Figure 5:
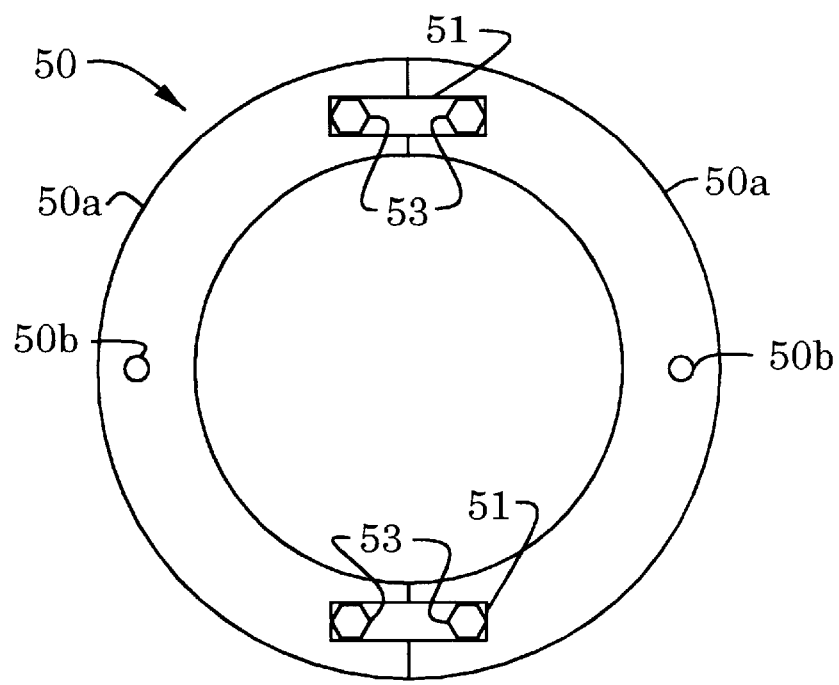
FIG. 5 is a plan view of the weather protection ring 50 of FIG. 1.

Referring now to FIG. 5, a plan view of weather protection ring 50 is shown. Ring 50 is comprised of two semi-circular half-rings 50a joined together by brackets 51 and bolts 53. Apertures 50b receive bolts 52 (FIG. 1) when ring 50 is attached to the underside of armature 26 to lower armature portion 27. Half-rings 50a are preferably constructed of lightweight materials designed for all weather climates. It is contemplated that other fastener/attachment mechanisms such as interlocking hooks, dovetail interlocking, mortise and tenon and the like may be used to join the half-rings 50a to one another without the need for brackets 51 and bolts 53.

It is contemplated that any of the "wind efficient" wind collectors known in the art may be substituted in place of wind collectors 24 and 54. Further, it is also contemplated that the armature 26 and windings 28 may be situated radially outside of the magnets 14 of the generator 10 as shown (substantially exchanging the location of the windings 28 and the magnets 14). Such a configuration would warrant an inversion of the present embodiment so that commutator rings and brushes may be located below the rotor and armature for protection from the weather and for serviceability.

While the invention has been illustrated and described in detail in the drawings and foregoing description of the preferred embodiments, the same is to be considered as illustrative and not restrictive in character, it being understood that only the preferred embodiments have been shown and described and that all changes and modifications that come within the spirit of the invention are desired to be protected.

What is claimed is:

1. A wind driven generator comprising:
a vertically oriented stationary pole;
commutator means coaxially disposed coaxially about and attached to said pole and including a first metal ring and a second metal ring, wherein said first metal ring and said second metal ring encircle said pole;
armature means coaxially disposed about said pole in close proximity to said commutator means, said armature means including a winding having a first lead and a second lead, said armature means further including a first brush and a second brush, said first brush situated to make contact with said first metal ring and said second brush situated to make contact with said second metal ring, and wherein said armature means includes first bearing means attached to and disposed between said armature means and said pole for reducing rotational friction;
rotor means coaxially disposed about said pole and disposed radially outward of and in close proximity to said armature means, said rotor means including a plurality of magnets situated adjacent said winding and producing a plurality of flux fields that impinge upon said winding when said rotor means rotates about said pole, and wherein said rotor means includes second bearing means attached to and disposed between said rotor means and said pole for reducing rotational friction;
first wind collecting means attached to said armature means for collecting wind and inducing said armature means to rotate with respect to said pole; and
second wind collecting means attached to said rotor means for collecting wind and inducing said rotor means to rotate in a direction opposing the direction of rotation of said armature means.

2. The device of claim 1 wherein said armature means includes a plurality of windings wound about said armature means and wherein each of said plurality of windings is electrically connected in series with said first lead and said second lead.

3. The device of claim 2 wherein said plurality of magnets are arranged on said rotor so that an alternating flux field is inwardly impinging upon said armature means.

4. The device of claim 3 wherein:
said first wind collecting means is a plurality of cups attached to the lowermost portion of said armature means and arranged about the periphery of said armature means; and
said second wind collecting means is a plurality of cups attached to and arranged about the periphery of said rotor means.

5. The device of claim 4 wherein said commutator means includes insulator means attached to said pole and wherein said first metal ring and said second metal ring are mounted on said insulator means.

6. The device of claim 3 wherein said pole includes a first protrusion extending outward from said pole upon which said first bearing rests and a second protrusion extending outward from said pole upon which said second bearing rests.

7. A wind driven generator comprising:
a stationary vertically oriented hollow pipe;
a vertically oriented hollow tube disposed about said pipe;
commutator means coaxially disposed coaxially about and attached to said tube and including a first metal ring and a second metal ring, wherein said first metal ring and said second metal ring encircle said tube;
armature means coaxially disposed about said tube in close proximity to said commutator means, said armature means including a winding having a first lead and a second lead, said armature means further including a first brush and a second brush, said first brush situated to make contact with said first metal ring and said second brush situated to make contact with said second metal ring, and wherein said armature means includes first bearing means attached to and disposed between said armature means and said tube for reducing rotational friction;

rotor means coaxially disposed about said tube and disposed radially outward of and in close proximity to said armature means, said rotor means including a plurality of magnets, situated adjacent said winding and producing a plurality of flux fields that impinge upon said winding when said rotor means rotates about said tube, and wherein said rotor means includes second bearing means attached to and disposed between said rotor means and said tube for reducing rotational friction;

first wind collecting means attached to said armature means for collecting wind and inducing said armature means to rotate with respect to said tube when wind currents are present;

second wind collecting means attached to said rotor means for collecting wind and inducing said rotor means to rotate in a direction opposite the direction of rotation of said armature means when wind currents are present; and vertical displacement means attached to said tube and attached to said pole for raising and lowering said tube on said pole.

8. The device of claim 7 wherein said vertical displacement means includes a first rotatable pulley disposed at the uppermost portion of said pipe and a second rotatable pulley disposed within said pipe near the lowermost portion of said pipe and a cable disposed over said first and said second pulleys and attached to said tube at a location above said rotor means.

9. The device of claim 8 wherein said armature means includes a plurality of windings wound about said armature means and wherein each of said plurality of windings is electrically connected in series with said first lead and said second lead.

10. The device of claim 9 wherein said plurality of magnets are arranged on said rotor so that an alternating flux field is inwardly impinging upon said armature means.

11. The device of claim 10 wherein:

said first wind collecting means is a plurality of cups attached to the lowermost portion of said armature means and arranged about the periphery of said armature means; and said second wind collecting means is a plurality of cups attached to and arranged about the periphery of said rotor means.

12. The device of claim 11 wherein said vertically oriented hollow tube is made of plastic.

13. The device of claim 12 including weather protection means disposed above said rotor means and attached to said hollow tube for protecting said generator from inclement weather.

* * * * *